United States Patent Office 2,924,546
Patented Feb. 9, 1960

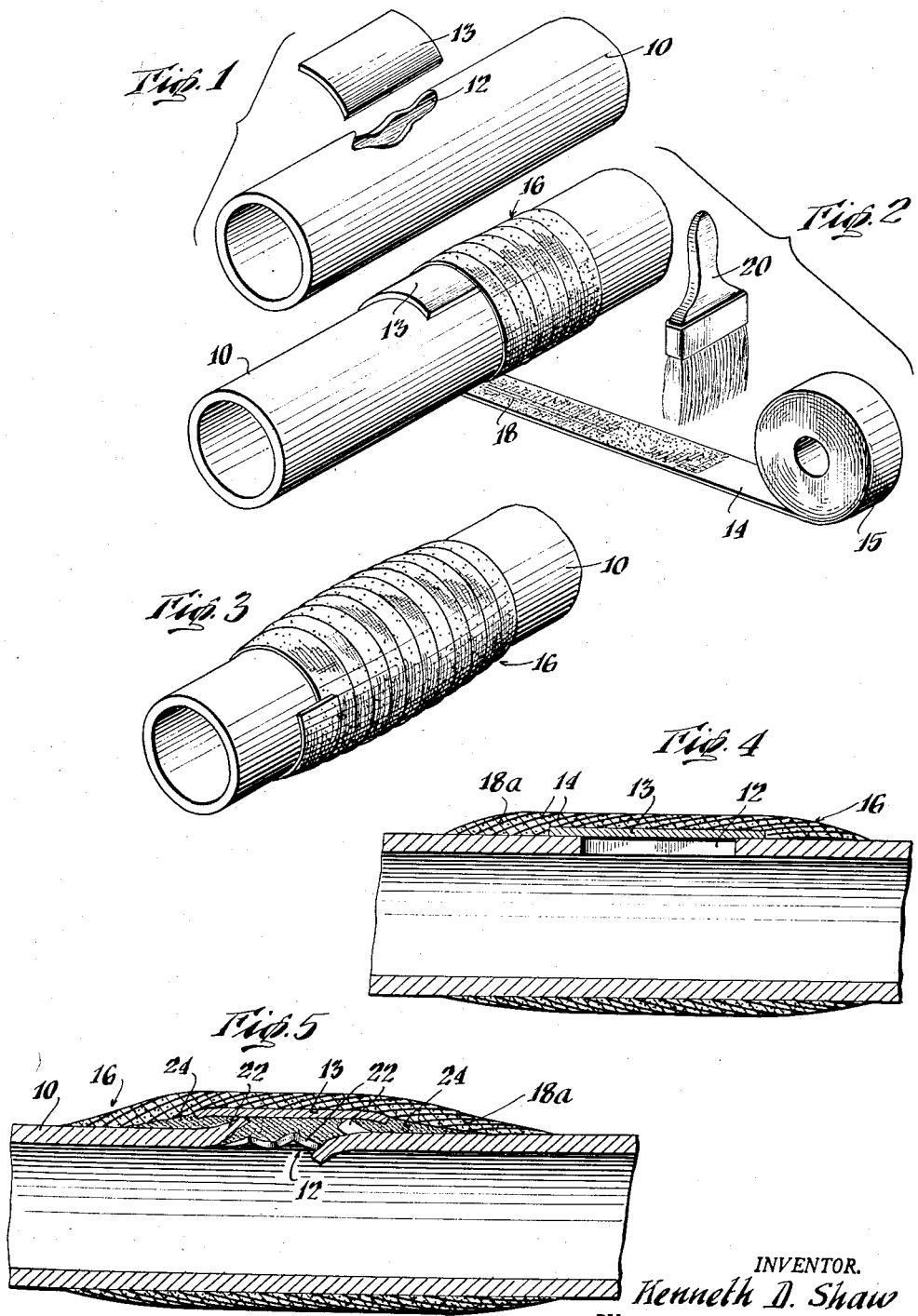

2,924,546

METHOD OF REPAIRING A RIGID HOLLOW ARTICLE

Kenneth D. Shaw, Vineland, N.J., assignor, by mesne assignments, to Cordo Chemical Corporation, Norwalk, Conn., a corporation of Connecticut Application May 28, 1952, Serial No. 290,398

8 Claims. (Cl. 154—104)

This invention relates to the reconstruction of pipe and more particularly to procedure and structure whereby damaged or otherwise imperfect pipe may be satisfactorily repaired, and in effect rebuilt, a chief object being to provide a rapid and satisfactory way of repairing pipe or the like at the locality in which it is installed. Indeed the operations and resulting structures which are herein described may be applicable in many cases to a variety of hollow articles, especially metal articles, but novel and especially unusual advantages are realized in the arrangements and methods of the invention with respect to pipe, the latter term being used to signify pipe of all sorts, tubing, and a variety of hollow conduits and ducts having the general characteristics of pipe.

Heretofore, when damage or other imperfection has occurred in some part of a pipe installation no simple and satisfactory method has been available for rapid repair of even a temporary character, short of replacing the damaged length or piece of pipe, or short of a welding or like operation. While various clamps or like attachments for engagement with the pipe, have been proposed to enclose or box in the locality of the hole, break or other defect, these appliances have been cumbersome and difficult to apply. Furthermore, it is not often practicable to keep a supply of various sizes of repair attachments on hand, especially in circumstances where storage and transportation involve a special problem. For example, in naval and other marine vessels, installations of piping are often very extensive, yet it is not feasible to carry spare pipe lengths and fittings, or even repair attachments, sufficient to handle all anticipated difficulties. At the same time it is seldom convenient or even possible to perform any kind of welding job, especially in as expeditious manner as might be required, for instance to take care of battle damage in pipe or tubing in a naval vessel. Likewise there are a great many other situations of pipe installation, e.g. in industrial plants or other pipe installations at remote localities, where a rapid repair of pipe damage or failure is often extremely desirable and yet where conditions have not heretofore made such repair an easy or even feasible operation.

Accordingly a specific object of the present invention is to provide a novel and unusually expeditious method for the reconstruction of pipe, and particularly a method that can be readily applied to practically any size and situation of pipe, yielding a repaired article which may be promptly restored to service and which may indeed need no further attention over long or even indefinite periods. A corollary and similarly important object is to afford such repair or reconstruction procedure, and likewise to provide reconstructed pipe or the like, for which readily stored and easily used materials are employed, such materials and the repair process itself being applicable to essentially all sizes of pipe and all portions of a piping installation. A like important object is to afford repair procedure and structure which requires no special skill on the part of personnel employing the same and which may nevertheless achieve effective and preferably long-lasting results.

Another and general object is to afford extremely rapid and highly effective repair procedure, whereby holes, breaks and similar imperfections (due to damage, wear or other cause) in articles of the type described above, can be satisfactorily patched, in a fashion that will permit prompt re-use of the installation and will withstand extremely high pressures and other conditions for which strength and durability are a prompt requisite.

In connection with the following description of the invention, reference may be made to the accompanying drawings which show certain useful embodiments of the procedure and completed structure, it being further understood that the invention may serve other objects than those outlined above, e.g. objects otherwise explained below or inherent in what is here disclosed.

Referring to the drawings:

Fig. 1 shows, somewhat diagrammatically, a portion of a pipe having a hole to be repaired, this view also showing application of a first step of the preferred repair operation of the invention;

Fig. 2 is a similarly illustrative view showing a second stage in the reconstruction of the pipe section;

Fig. 3 shows the completed, repaired pipe;

Fig. 4 is a longitudinal, central section of the repaired pipe structure; and

Fig. 5 is a longitudinal section, similar to Fig. 4, but showing a modified arrangement embodying the invention.

As indicated above, the new method is applicable to a variety of structures, especially pipe having at a given locality a discontinuity, e.g. a damaged condition or other region of imperfection, usually represented by a hole or holes in the pipe. By way of example of a wide variety of kinds of damage that may be repaired with the present invention, Fig. 1 shows a length of pipe 10 (e.g. iron or steel pipe) having an irregular hole 12 which is to be patched. It may be understood that the pipe 10 is a portion of a given pipe installation, as for conveying water, steam, gasoline, or any of a variety of liquids or gases, and that it is, as usual, not feasible to remove the pipe section for repair. Ordinarily, however, the flow of fluid through the pipe should be interrupted during the repair operation.

In accordance with the present invention, a structure is built in place, around the pipe and covering the hole 12, which embodies a reinnforced mass of synthetic resin material, i.e. an ultimately solidified substance of the class of so-called plastics. As a part of the preferred process of applying the encasing structure, there is first disposed over the hole 12 a simple patching piece 13 (such as impervious fabric, metal sheet or the like), conveniently here called a void patch or void cover. For instance, the void cover 13 may be a thin piece of stiff but slightly flexible fibrous sheet material, e.g. glass fiber cloth, which has been impregnated with a synthetic resin (or suitable impermeable coating) and in and upon which the resin has been cured and set. Thus the cover 13 is a stiff element, somewhat of the nature of heavy cardboard, but essentially impervious.

After the void cover has been disposed in place, the assembly is covered with a wrapping of fibrous material in strip or sheet form, while a loading of a self-curing resin material is applied or maintained in the fibrous wrapping. More specifically, in accordance with the present invention, a wrapping is provided which is impregnated, preferably not later than the time of its application, with the resin material in more or less liquid form, the resin material being one of the class of so-called self-curing resins, i.e. a material which as finally prepared and applied to the wrapping or the tape used for the latter, will eventually cure into a solidified, tough, impermeable state, such curing coming about spontaneously after the wrapping is applied.

Thus, for example, in Fig. 2, the assembly is shown in the course of wrapping with a tape 14 of glass fiber cloth, preferably rather closely woven (as is also the case with the void patch 13) and impregnated with the self-curing resin in liquid form. As shown, the tape is drawn from a roll 15 and is wrapped spirally or helically about the pipe as indicated at 16. For purposes of illustration the self-curing resin material 18 in and on the tape is shown as being applied with a brush 20, one convenient practice being to brush the wet material on both sides of the tape 14, incrementally as the latter is wound around the pipe. Alternatively, other ways of applying the self-curing resin mixture to the tape may be used, including dipping the latter in or passing it through a small tank of such substance. In any event, as the wrapping is built up, with reasonable tightness, around the pipe 10 (Fig. 2) it carries a substantial amount of the resin material, indeed preferably as much of the latter as the tape can carry.

The finally completed wrap is shown in Figs. 3 and 4, it being noted that the wrapped region extends well beyond the boundaries of the hole 12, i.e. in a longitudinal direction along the pipe. The final condition of the article thus represents a helical wrapping of the impregnated tape, the impregnating liquid, usually rather viscous, and usually somewhat in excess of what the tape may actually absorb, being constituted essentially as a body of such material 18a (Fig. 4) which is reinforced by the tape wrapping. As the resin thereafter cures, by a spontaneous, exothermic reaction, the finished and solidified structure is thus also as shown in Fig. 4, consisting of the impregnated body 18a closely engaging the pipe and in fact held in place by the multiplicity of turns of the wrapping 16.

Among various so-called self-curing resin mixtures which may be used, specific mention may be made of the so-called polyester resins, these being understood to be maleic anhydride (or fumaric anhydride or other dibasic acid) poly-ol esters cross linked with a vinyl monomer. As used, the uncured resin material, usually available in a liquid form, is mixed with the needed catalyst or curing agent, and preferably also a suitable accelerator; the final liquid mixture, preferably of a viscous nature so that it does not run off readily from the impregnated wrapping 16, is then capable of self-curing. That is to say, in the course of a period of time, the curing reaction commences, and thereafter proceeds exothermically to convert the material to a hard, solidified state. As will be appreciated, the mixture should be so chosen that the onset of cure is somewhat delayed, i.e. is sufficiently slow as to permit the mixing of a batch and its use for coating the glass fiber cloth, without appreciable change until the wrapping is completed. Ultimately however, the curing reaction occurs and progresses as its exothermic nature builds up heat in the body. The total time of cure, i.e. from the original establishment of the mixture, may be of the order of 15 minutes to an hour or so.

By way of further description of this example, a suitable catalyst for the polyester resin may consist of a mixture of 50% (by weight) benzoyl peroxide and 50% tricresyl phosphate. The accelerator may be cobalt naphthenate, or alternatively, cobalt linoleate. For instance, successful results were had with each of two polyester resins, both in liquid form, and respectively known as Marco MR-28 and Marco MR-29. A preferred mix may thus consist of 90% (by weight) of either of the resins just mentioned, with 5% each of the catalyst or curing agent, and the accelerator, such as described. The actual proportions of the substances in the resin mix are not necessarily critical, some variation being possible, especially to achieve variation in the speed of cure. Indeed with the formula last mentioned, cure rates of the order of 10 to 30 minutes are easily achieved.

An alternative self-curing resin, which would appear to be useful in some cases instead of the polyester resin, may be a melamine-aldehyde condensate or urea-aldehyde condensate, either of these compounds being mixed, for establishment of the resin in the spontaneously curable state, with an organic acid such as maleic acid or phthalic acid, or with a salt which will dissociate to liberate acid ions. Yet another self-curing material, also to be made up at the time and place of use, is a product resulting from mixing an aldehyde (such as formaldehyde, and more particularly paraformaldehyde), with a suitable acid and a substance such as a polymerized reaction product of anacardic acid, the latter product being derived, for instance, from cashew nut shell liquid and being conveniently defined as comprising acid-polymerized components of such liquid.

As indicated, the ultimate pipe repair structure involves an impregnation, preferably a heavy impregnation, of the self-curing resin mix, e.g. a polyester resin or other material as described above. While a special feature of the invention is the use of glass fiber cloth, i.e. woven or braided textile material made of glass fibers, alternative fibrous material (for instance, woven asbestos fabric) may be used in some cases. In general, the fibrous reinforcing material should be constituted in the form of a tape or long strip, and very preferably composed of inorganic matter, another example being closely woven wire cloth, as of stainless steel, aluminum, steel or bronze wire. In some cases a felted fabric may be employed, e.g. a felted fabric of glass fibers, preferably long glass fibers, but the glass fiber textile is generally far superior, especially for strength and durability of the completed pipe repair structure.

As also explained, an important feature of the invention is that the winding or wrapping of glass fiber fabric be impregnated with the liquid and preferably viscous resin material which is conditioned to cure spontaneously in a short period of time. The impregnation with the fluid resin mix is preferably effected before the fabric tape or the like is actually brought into contact with the pipe, i.e. for example by painting the fabric on both sides with the resin as the fabric is wound or by preliminarily passing the fabric through a bath of the resin. Alternatively, the pipe can be wrapped and the impregnating resin then applied and worked in; however, impregnation or soaking of the fabric material prior to its wrapping is unusually effective and thus specifically important in most cases, for achievement of the desired close conformity and adherence of the ultimately solidified structure to the pipe. While the drawings, for simplicity, show essentially only a single layer wrapping of the fabric tape, it will be understood that a plurality of such layers may be and indeed preferably are used in most instances, the impregnated, wet tape being thus wound spirally, or more precisely, helically, along the pipe in one direction, then back in the same way over the first layer and then if desired, again forward over the second layer, the number of layers being dependent on the ultimate strength desired for the finished and solidified wrapping.

In some instances, the surface of the pipe or other article, particularly in the vicinity of the opening or like imperfection, may be of an irregular contour. For example, the hole or damage may occur in the vicinity of a flange or collar structure, or the damaged condition may be of a nature involving outwardly projecting broken portions of the pipe wall, e.g. as indicated at 22 in Fig. 5, where such a break is shown around the opening 12 in the pipe 10. Under such circumstances a further feature of the invention comprises applying a putty-like material to or around the irregular surface, to build the latter up to a smooth configuration suitable for close wrapping with the fabric tape, and likewise suitable for seating of the void cover 13. Such putty-like material may conveniently comprise a mixture of the self-curing resin, e.g. in viscous fluid form conditioned to cure spontaneously, with an appropriate fibrous and reinforcing filler, preferably a filler of some absorptive properties. Thus by taking a mixture of the self-curing polyester resin mix described above, with asbestos fiber in loose, unwoven form, an appropriate moldable material may be constituted, the ingredients being thoroughly mixed or kneaded together to provide a homogeneous mass. The relative quantities of resin mix and fibrous material may vary somewhat, being usually about 50% of each by weight; in most cases the requirement is simply to include enough of the fibrous mass so that the product is sufficiently stiff to stand of itself, yet sufficiently plastic to permit molding and fitting to the irregularities of the surface structure. Other fibrous materials may be used, such as unwoven glass fibers, preferably long glass fiber. If glass fiber is employed, there is preferably also included some other, more absorbent material, such as asbestos fiber or cellulose fibers.

As explained, the body of putty-like material 24 is built-up around the irregular surface, so as to produce a fairing around the opening 12, but ordinarily is not made to enclose the opening with such fairing. Thereupon the void patch 13 may be seated in good conformity over the fairing and the wrapping 16 of resin-impregnated tape wound around the entire assembly, so as to enclose the void cover 13 and the fairing, as well as adjacent parts of the pipe body. The faired structure may thus be readily wrapped with the wet resin tape, in appropriately tight conformity. In consequence the entire structure, including both the fairing 24 and the resin material 18a of the tape wrapping, cures spontaneously to constitute a rigid, thoroughly reinforced structure in conforming engagement with the pipe surface and fully and securely sealing the opening 12.

As produced by the simpler procedure of Figs. 1 and 2, or with the inclusion of an underlying body of moldable non-fluid material, the ultimately wrapped and cured reconstruction of the pipe appears essentially as in Fig. 3. The solidified, wrapped structure not only engages the pipe but constitutes a strong, impervious repair, held firmly in place and remarkably resistant to high fluid pressure when the pipe is thereafter again put in use. Indeed, pipes repaired in the manner described herein, have been found to withstand pressures of several hundred pounds per square inch, in the case of both liquids and gases, withou appreciable leakage at or around the reconstructed portion. Furthermore, the repaired structure is essentially very durable and the pipe may be continued in service for long periods of time, even though it may ultimately, although by no means necessarily, be replaced at some future date with a new pipe section. Indeed the procedure and resulting structures of the present invention may be aptly characterized as a reconstruction of the damaged or imperfect articles, in contrast to repairs of a temporary or cumbersome type which might be expected to serve for only a few hours or a few days. As also indicated, and particularly with the aid of the fairing utilized in Fig. 5, the repair operation is adaptable to a variety of pipe surfaces and to the repair of damage involving breakage, bending, tearing or other distortion of the pipe wall, as well as to damage in irregularly shaped parts of a piping installation or the like.

It is to be understood that the invention is not limited to the specific steps and structures herein shown and described, but may be carried out in other ways without departure from its spirit.

I claim:
1. A method of repairing a rigid, hollow article having a local fluid permeable discontinuity therein, comprising applying to the article a wrapping of closely woven glass fiber fabric over and adjacent said discontinuity, wetting the wrapping thoroughly, about the time of applying the wrapping to the article, with a fluid, self-curing resin mixture conditioned to cure spontaneously, and allowing said resin to cure and thereby to constitute a fabric-reinforced hard solid body, impermeable to fluid under pressure, enclosing said discontinuity and adhering with close conformity to the article.

2. The method defined in claim 1, in which the wrapping is wet thoroughly with the resin mixture just prior to its application to the article.

3. The method defined in claim 1, in which the wrapping is wet thoroughly with the resin mixture just after its application to the article.

4. A method of repairing in situ a pipe connected in a plumbing installation and having a local fluid permeable discontinuity therein, comprising applying to the pipe a generally helical wrapping of closely woven glass fiber fabric over and adjacent said local discontinuity, wetting the wrapping thoroughly, about the time of applying the wrapping to the article, with a fluid, self-curing resin mixture conditioned to cure spontaneously, and allowing said resin to cure and thereby to constitute a fabric reinforced hard solid body, impermeable to fluid under pressure, enclosing said discontinuity and adhering with close conformity to the pipe.

5. A method of repairing a rigid, hollow article having a local fluid permeable discontinuity therein, comprising disposing over said discontinuity a piece of solid sheet material consisting essentially of woven glass fiber fabric impregnated with a self-curing resin mixture and cured, applying around the article and said piece of sheet material a generally helical wrapping of closely woven glass fiber fabric over and adjacent said locality, wetting the wrapping thoroughly, about the time of applying the wrapping to the article, with said self-curing resin mixture in a fluid state and conditioned to cure spontaneously, and allowing said resin to cure and thereby to constitute said wrapping and said sheet material into a fabric reinforced hard solid body, impermeable to fluid under pressure, enclosing said discontinuity and adhering with close conformity to the article.

6. A method of repairing a locality of a rigid, hollow article having a local discontinuity with an irregular surface, comprising preliminarily building said irregular surface up to a smooth surface suitable for close wrapping with fabric material by applying to said irregular surface a moldable mixture consisting essentially of a self-curing resin and fibrous material mixed therewith, applying to the article and over said built-up surface a wrapping of closely woven glass fiber fabric over and adjacent said discontinuity, wetting the wrapping thoroughly, about the time of applying the wrapping to the article, with said self-curing resin mixture in a fluid state and conditioned to cure spontaneously, and allowing said resin to cure and thereby to constitute a fabric-reinforced hard solid body enclosing said discontinuity and adhering with close conformity to the article.

7. The method of claim 6, in which said fibrous material comprises about 50% of the moldable mixture by weight and includes a mixture of glass fibers and asbestos fibers.

8. A method of repairing a locality of a rigid, hollow article having a local discontinuity with an irregular surface therein, comprising preliminarily building up said irregular surface to form a smooth seat encircling said discontinuity by applying to said irregular surface a moldable mixture consisting essentially of a self-curing resin and fibrous material mixed therewith, disposing over said discontinuity and in contact with said seat a piece of solid sheet material consisting essentially of woven glass fiber fabric impregnated with a self-curing resin mixture and cured, applying around the article and said piece of sheet material a generally helical wrapping of closely woven glass fiber fabric over and adjacent said locality, wetting the wrapping thoroughly, about the time of applying the wrapping to the article, with said self-curing resin mixture in a fluid state and conditioned to cure spontaneously, and allowing said resin to cure and thereby to constitute said wrapping and said sheet material into a fabric reinforced hard solid body enclosing said discontinuity and adhering with close conformity to the article.

References Cited in the file of this patent

UNITED STATES PATENTS

| | | |
|---|---|---|
| 599,203 | Stenger et al. | Feb. 15, 1898 |
| 647,996 | Smith | Apr. 24, 1900 |
| 1,311,392 | Harrison | July 29, 1919 |
| 1,445,858 | Tallman | Feb. 20, 1923 |
| 1,728,250 | Pike | Sept. 17, 1929 |
| 1,772,378 | Witt | Aug. 5, 1930 |
| 2,054,769 | Holtz | Sept. 15, 1936 |
| 2,069,722 | Merrill | Feb. 2, 1937 |
| 2,360,109 | Converse | Oct. 10, 1944 |
| 2,472,963 | Singleton | June 14, 1949 |
| 2,473,784 | Carlin et al. | June 21, 1949 |
| 2,504,509 | Erickson | Apr. 18, 1950 |
| 2,529,060 | Trillich | Nov. 7, 1950 |
| 2,569,540 | Selby | Oct. 2, 1951 |
| 2,623,571 | Webber | Dec. 30, 1952 |
| 2,653,887 | Slayter | Sept. 29, 1953 |

OTHER REFERENCES

Smooth-On Handbook, p. 80; 1926, Smooth-On Mfg. Co.

Modern Plastics, "Ethoxylines," November 1950; pp. 85–88.

Modern Plastics, October 1952; p. 96: "Plastic Pipe Patches."